United States Patent [19]
Igarashi

[11] Patent Number: 6,115,333
[45] Date of Patent: Sep. 5, 2000

[54] METHOD AND APPARATUS FOR CALIBRATING OPTICAL DISC SYSTEMS

[75] Inventor: Katsuji Igarashi, Tokyo, Japan

[73] Assignee: Sony Corporation, Tokyo, Japan

[21] Appl. No.: 08/961,572

[22] Filed: Oct. 30, 1997

[30] Foreign Application Priority Data

Oct. 31, 1996 [JP] Japan .................................. 8-289456

[51] Int. Cl.[7] .................................................. G11B 7/00
[52] U.S. Cl. ........................ 369/44.27; 369/58; 369/94
[58] Field of Search ......................... 369/44.27, 44.28, 369/44.29, 44.34, 44.25, 47, 48, 49, 50, 54, 58, 59, 60, 32, 94

[56] References Cited

U.S. PATENT DOCUMENTS

| | | | |
|---|---|---|---|
| 5,499,231 | 3/1996 | Fennema et al. | 369/124 |
| 5,808,989 | 9/1998 | Ueki et al. | 369/58 |

FOREIGN PATENT DOCUMENTS

| | | |
|---|---|---|
| 0 285 461 | 10/1988 | European Pat. Off. . |
| 0 609 882 | 8/1994 | European Pat. Off. . |
| 0 611 120 | 8/1994 | European Pat. Off. . |
| 0 684 599 | 11/1995 | European Pat. Off. . |
| 0 724 256 | 7/1996 | European Pat. Off. . |
| 0 749 117 | 12/1996 | European Pat. Off. . |
| 767 455 A2 | 4/1997 | European Pat. Off. . |
| 0 807 926 | 11/1997 | European Pat. Off. . |
| 08185636 | 7/1996 | Japan . |

*Primary Examiner*—Muhammad Edun
*Attorney, Agent, or Firm*—Frommer Lawrence & Haug, LLP; William S. Frommer

[57] ABSTRACT

A system for initializing an optical disc player when reproduction of data from a side of a multilayer disc is desired. The initialization procedure involves determining one or more initialization values for a first layer of data on the side, storing the initialization values determined for the first layer, and repeating the determining and storing steps for the other layers on the side.

26 Claims, 10 Drawing Sheets

METHOD AND APPARATUS FOR CALIBRATING OPTICAL DISC SYSTEMS

FIELD OF THE INVENTION

This invention relates to optical disc systems, and more particularly to a technique for calibrating optical disc systems that are capable of reproducing data from multilayer discs.

BACKGROUND OF THE INVENTION

The advent of optical disc storage has given rise to many optical disc storage formats. One such format is the audio optical disc, which is commonly referred to as the "Compact Disc" (or "CD"). Another format is the computer data optical disc, which is commonly referred to as the "Compact Disc Read Only Memory" (or "CD-ROM"). However, regardless of the storage format used, optical discs are generally similar in their physical layout. That is, in a typical optical disc information is recorded by forming "pits" in the disc, the pits being circumferentially arranged to form a multiple of concentric "tracks", and the tracks lying within an "optical layer" (or plane of focus).

To read information stored on an optical disc, the disc is rotated while a beam of light is directed at the disc, and the reflections of the beam by the disc are monitored—the arrangement of pits on the disc being determinable from the monitored reflections and the stored information being determinable from the arrangement of pits. However, before attempting to read information from the disc, the reading system must be calibrated, or "initialized". That is, the value of certain system parameters must be initially determined so that the light beam can be properly focused on the optical layer and can properly follow the pitted tracks within the layer. Since the typical disc has only one optical layer, the initialization procedure is performed only once when reading a typical disc.

The same initialization procedure that is used for the typical disc may be used for certain non-typical discs. For example, the above-described initialization procedure is sufficient for use in a two-sided/one-optical-layer-per-side system. In such a system a disc has two readable sides with each side having one optical layer, and therefore the standard initialization procedure is simply applied to each side in the same manner that it is applied in the one sided (typical) disc. However, the standard initialization procedure is not adequate for all non-typical discs, such as the multilayer disc, in which one or both sides of the disc has multiple optical layers.

OBJECTS AND SUMMARY OF THE INVENTION

It is an object of the present invention to provide an initialization procedure suitable for use with multilayer optical discs.

It is a further object of the present invention to provide a rapid initialization procedure suitable for use with multilayer optical discs.

In accordance with the invention, initializing an optical disc player when reproduction of data from a side of a multilayer disc is desired involves determining one or more initialization values for a first layer of data on the side, storing the initialization values determined for the first layer, and repeating the determining and storing steps for the other layers on the side.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Prior to describing preferred initialization procedures according to the invention, a multilayer optical disc reproduction system suitable for implementing the initialization procedures will be described.

Figure 1:
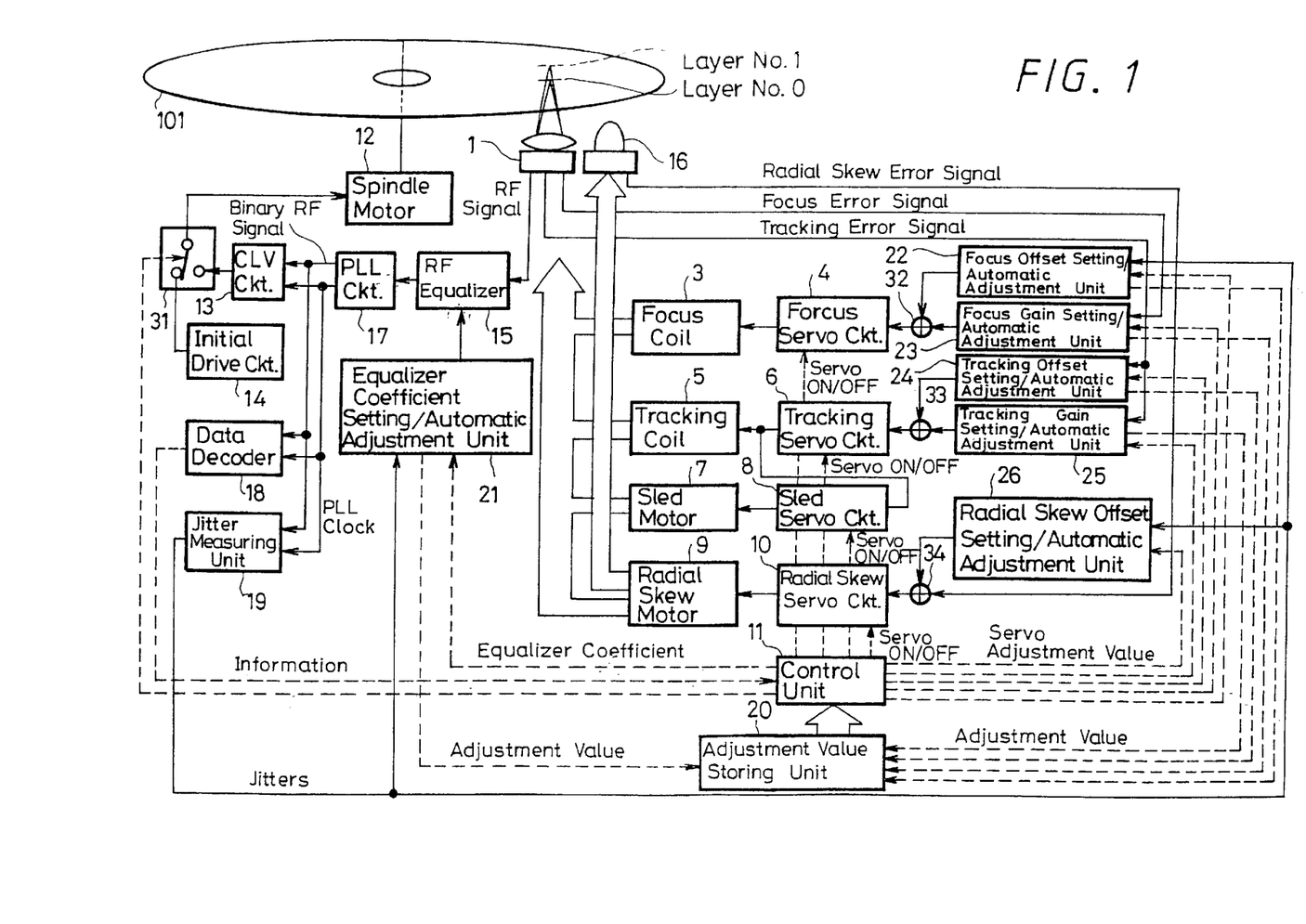
FIG. 1 is a block schematic diagram of a multilayer optical disc reproduction system suitable for implementing the initialization technique of the invention.

FIG. 1 is a block schematic diagram of a multilayer optical disc reproduction system suitable for implementing the initialization technique of the invention. The system includes an optical pick-up 1 which focuses laser light onto a multilayer optical disc 101 and is operable to detect light reflected from the disc. The figure's depiction of the multilayer disc as a two layer disc ("layer 0" and "layer 1") is for illustrative purposes only, and it is noted that the invention is applicable to discs having more than two layers. In any event, the optical pick-up allows disc 101 to be read by performing a photoelectric conversion on the detected reflections. The signal resulting from the conversion is processed to derive three distinct signals: an RF (or "Radio Frequency") signal, which corresponds to the data being read; a focus error signal, which corresponds to a deviation from idealized focus; and a tracking error signal, which corresponds to a deviation from idealized tracking. The optical pick-up outputs the RF signal to an RF equalizer 15, outputs the focus error signal to a focus gain setting/automatic adjustment unit 23, and outputs the tracking error signal to a tracking offset setting/automatic adjustment unit 24 and a tracking gain setting/automatic adjustment unit 25. The manner in which the optical pickup output signals are used to derive initialization values will be discussed in the context of the following element-by-element description of the FIG. 1 system.

As mentioned above, the RF signal is passed to the RF equalizer 15. The equalizer converts the RF signal received from the optical pick-up into a binary signal, low pass filters the binary signal, and outputs the binary signal to a PLL (or "Phase Locked Loop") circuit 17. The filtering function of the RF equalizer is implemented through, for example, a three tap transversal low pass filter—the tap coefficients for the filter being supplied by an equalizer coefficient setting/automatic adjustment unit 21.

The PLL circuit 17 generates a clock signal based upon the binary signal received from the RF equalizer and outputs both the clock signal and binary signal to a CLV (or "Constant Linear Velocity") circuit 13, a data decoder 18, and a jitter measuring unit 19.

The CLV circuit 13 generates a CLV control signal based upon the received clock signal and binary signal. The CLV control signal is coupled through a switch 31, and it is used to control the rotational speed of the disc such that speed at which data within a track crosses the optical pick-up beam is the same for each track on the disc—regardless of the radial position of the beam with respect to the disc's center. The disc is rotated by a spindle motor 12, and thus to implement constant linear velocity rotation, the switch couples the CLV control signal to the spindle motor 12.

An initial driving circuit 14 is provided for generating a non-CLV control signal. The non-CLV control signal is coupled to the spindle motor 12 by switch 31 as an alternative to the CLV control signal, and it causes the disc to rotate at a constant angular speed. The position of switch 31 is controlled by a control unit 11 (to be described in more detail below).

The data decoder 18 decodes the data read from the optical disc by processing the binary signal and clock signal received from the PLL circuit. The decoder then outputs the decoded data, and in addition outputs the address of the disc sector from which the data originated. For purposes of the present description, the decoder output is considered to be passed solely to the control unit; however, it should be noted that in practice the decoder output is passed to other circuit (s) as well.

The jitter measuring unit 19 measures the amount of jitter in the system through processing of the binary signal and clock signal. Jitter refers to system noise and/or aberration that appears as error in the optical pick-up position. The are four recognized sources of jitter: (1) interference between pit reflections; (2) distortion of detected reflections caused by one or more aberrations in the optical pick-up; (3) noise, such as laser noise, crosstalk and media defect noise; and (4) error, such as phase error resulting from the PLL's failure to properly adapt to variations in the rotational speed of the disc, and modulation/demodulation error from the modulation/demodulation circuitry. In any event, the jitter measuring unit outputs an indication of the jitter level to the equalizer coefficient setting/automatic adjustment unit 21, the focus offset setting/automatic adjustment unit 22, and a radial skew offset setting/automatic adjustment unit 26.

The equalizer coefficient setting/automatic adjustment unit's function during initialization is to calculate one or more coefficient values for each layer on the multilayer optical disc and to store the calculated coefficient values in an adjustment value storing unit 20. During reproduction of a particular disc layer, the equalizer coefficient unit is responsive to a layer indication signal, the unit receiving the stored coefficient(s) corresponding to the layer being reproduced as indicated by the layer indication signal. The coefficient(s) received by the equalizer coefficient unit are passed to the RF equalizer.

The focus offset setting/automatic adjustment unit's function during initialization is to calculate a focus offset adjustment value for each layer on the multilayer disc based on the jitter level received from the jitter measuring unit, and to store the calculated focus offset adjustment values in the adjustment value storage unit. During reproduction of a particular disc layer, the focus offset unit is responsive to the layer indication signal, the unit receiving the stored focus offset adjustment value corresponding to the layer being reproduced as indicated by the layer indication signal. The focus offset adjustment value received by the focus offset unit is passed to an adder 32.

The focus gain setting/automatic adjustment unit's function during initialization is to calculate a focus gain adjustment value for each layer on the multilayer disc based on the focus error signal received from the optical pick-up, and to store the calculated focus gain adjustment values in the adjustment value storage unit. During reproduction of a particular disc layer, the focus gain unit is responsive to the layer indication signal, the unit receiving the stored focus gain adjustment value corresponding to the layer being reproduced as indicated by the layer indication signal. The focus gain adjustment value received by the focus gain unit is used by the unit to amplify the focus error signal. The amplified focus error signal generated by the focus gain unit is passed to adder 32.

The adder 32 simply adds the focus offset adjustment value received from the focus offset unit to the amplified focus error signal received from the focus gain unit and outputs the sum to a focus servo circuit 4.

The focus servo circuit 4 is turned on and off by a focus servo control signal from the control unit 11. When turned on, the focus servo circuit generates a focus coil control signal in response to the sum received from adder 32. The focus coil control signal controls adjustment of the optical pick-up's focus position through a focus coil 3. Thus, for example, the focus coil moves an objective lens of the optical pick-up to change the focus position of the pick-up in accordance with the focus coil control signal received from the focus servo circuit.

The tracking offset setting/automatic adjustment unit's function during initialization is to calculate a tracking offset adjustment value for each layer on the multilayer disc based on the tracking error signal received from the optical pick-up, and to store the calculated tracking offset adjustment values in the adjustment value storage unit. During reproduction of a particular disc layer, the tracking offset unit is responsive to the layer indication signal, the unit receiving the stored tracking offset adjustment value corresponding to the layer being reproduced as indicated by the layer indication signal. The tracking offset adjustment value received by the focus offset unit is passed to an adder 33.

The tracking gain setting/automatic adjustment unit's function during initialization is to calculate a tracking gain adjustment value for each layer on the multilayer disc based on the tracking error signal received from the optical pick-up, and to store the calculated tracking gain adjustment values in the adjustment value storage unit. During reproduction of a particular disc layer, the tracking gain unit is responsive to the layer indication signal, the unit receiving the stored tracking gain adjustment value corresponding to the layer being reproduced as indicated by the layer indication signal. The tracking gain adjustment value received by the tracking gain unit is used by the unit to amplify the tracking error signal. The amplified tracking error signal generated by the tracking gain unit is passed to adder 33.

The adder 33 simply adds the tracking offset adjustment value received from the tracking offset unit to the amplified tracking error signal received from the tracking gain unit and outputs the sum to a tracking servo circuit 6.

The tracking servo circuit 6 is turned on and off by a tracking servo control signal from the control unit 11. When turned on, the tracking servo circuit generates a tracking control signal in response to the sum received from adder 33.

The tracking control signal controls adjustment of the optical pick-up's tracking position through a tracking coil 3. Thus, for example, the tracking coil moves the optical pick-up radially to change the tracking position of the pick-up in accordance with the tracking control signal received from the tracking servo circuit.

The tracking control signal also controls adjustment of the optical pick-up's radial position relative to the center of the disc; however, the radial position is controlled through a sled servo circuit 8 and a sled motor 7 rather than through the tracking coil.

The sled servo circuit is turned on and off by a sled servo circuit control signal from the control unit 11. When turned on, the sled servo circuit generates a sled motor control signal in response to the tracking control signal. The sled motor control signal controls the radial position of the optical pick-up through the sled motor. Thus, for example, the sled motor moves the optical pick-up radially with respect to the disc's center in order to change the position of the pick-up in accordance with the sled motor control signal received from the sled servo circuit.

A radial skew offset setting/automatic adjustment unit 26 is provided for calculating radial skew offset adjustment values based on the jitter level received from the jitter measuring unit, and for storing the calculated radial skew offset adjustment values, the calculation and storage of the radial skew offset adjustment values being performed during initialization. During reproduction, the radial skew offset unit passes the values to an adder 34.

A skew sensor 16 is provided for the purpose of measuring the skew of the optical disc and generating a radial skew error signal that is indicative of the measured skew. The skew sensor includes a light-emitting portion which emits a light beam toward the optical disc, and a light-receiving portion for detecting reflections from the disc of the emitted beam. The detected reflections are photoelectrically converted to form the radial skew error signal, which is then passed to the adder 34.

Adder 34 adds the radial skew offset adjustment values received from the radial skew offset setting/automatic adjustment unit to the radial skew error signal received from the radial skew sensor and outputs the sum to a radial skew servo circuit 10.

The radial skew servo circuit 10 is turned on and off by a radial skew servo control signal from the control unit 11. When turned on, the radial skew servo circuit generates a radial skew motor control signal in response to the sum received from adder 34. The radial skew motor control signal controls adjustment of the optical pick-up's skew position through a radial skew motor 9. Thus, for example, the radial skew motor moves an objective lens of the optical pick-up to change the skew position of the pick-up in accordance with the radial skew motor control signal received from the radial skew servo circuit.

Having described a multilayer optical disc reproduction system suitable for implementing the initialization procedure of the invention, first and second embodiments of the initialization procedure will now be described in detail with references to the described reproduction system.

Figure 2A:
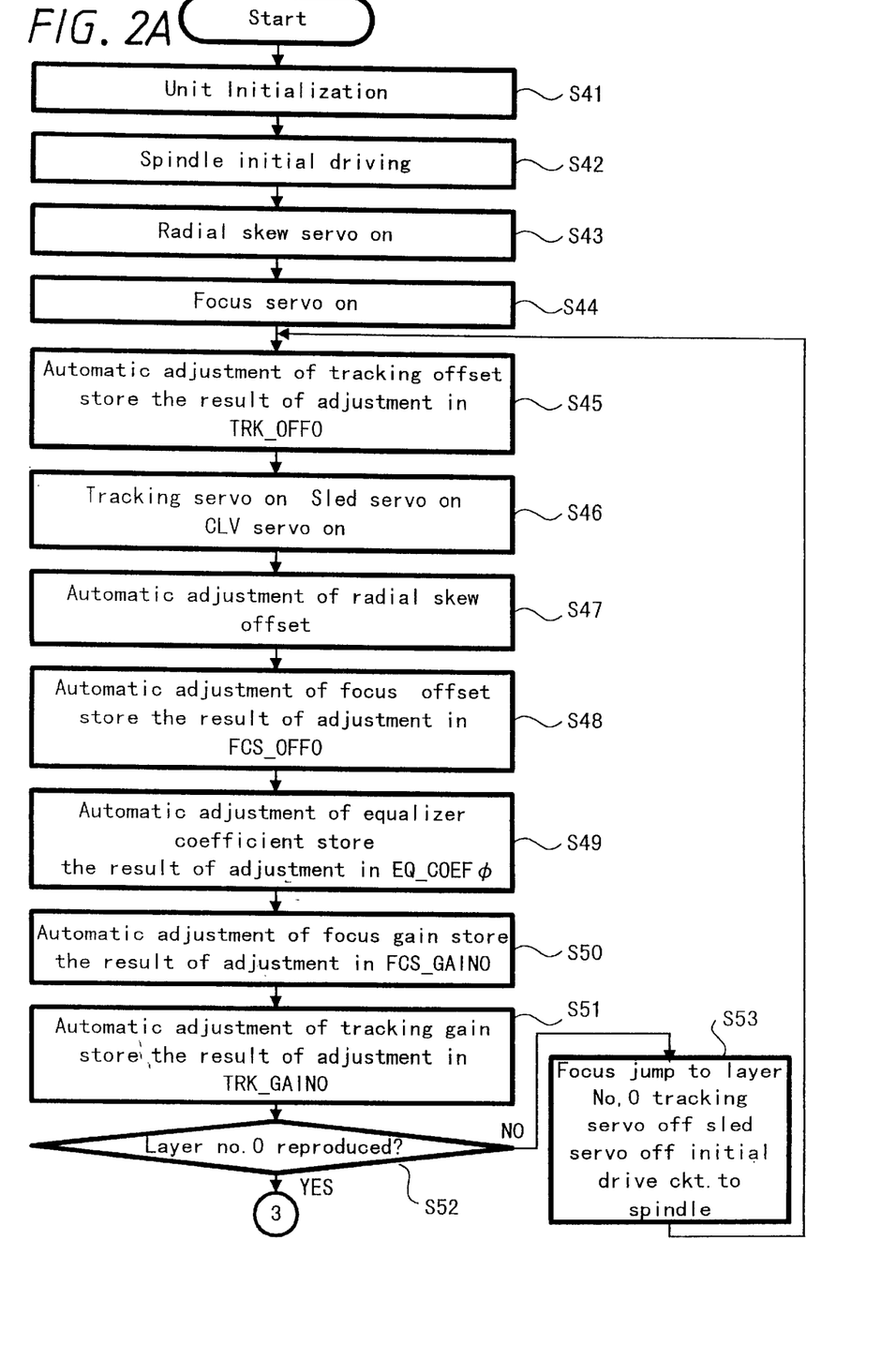
FIGS. 2A and 2B make up a flow chart useful in describing an initialization procedure in accordance with a first embodiment of the invention.
Figure 2B:
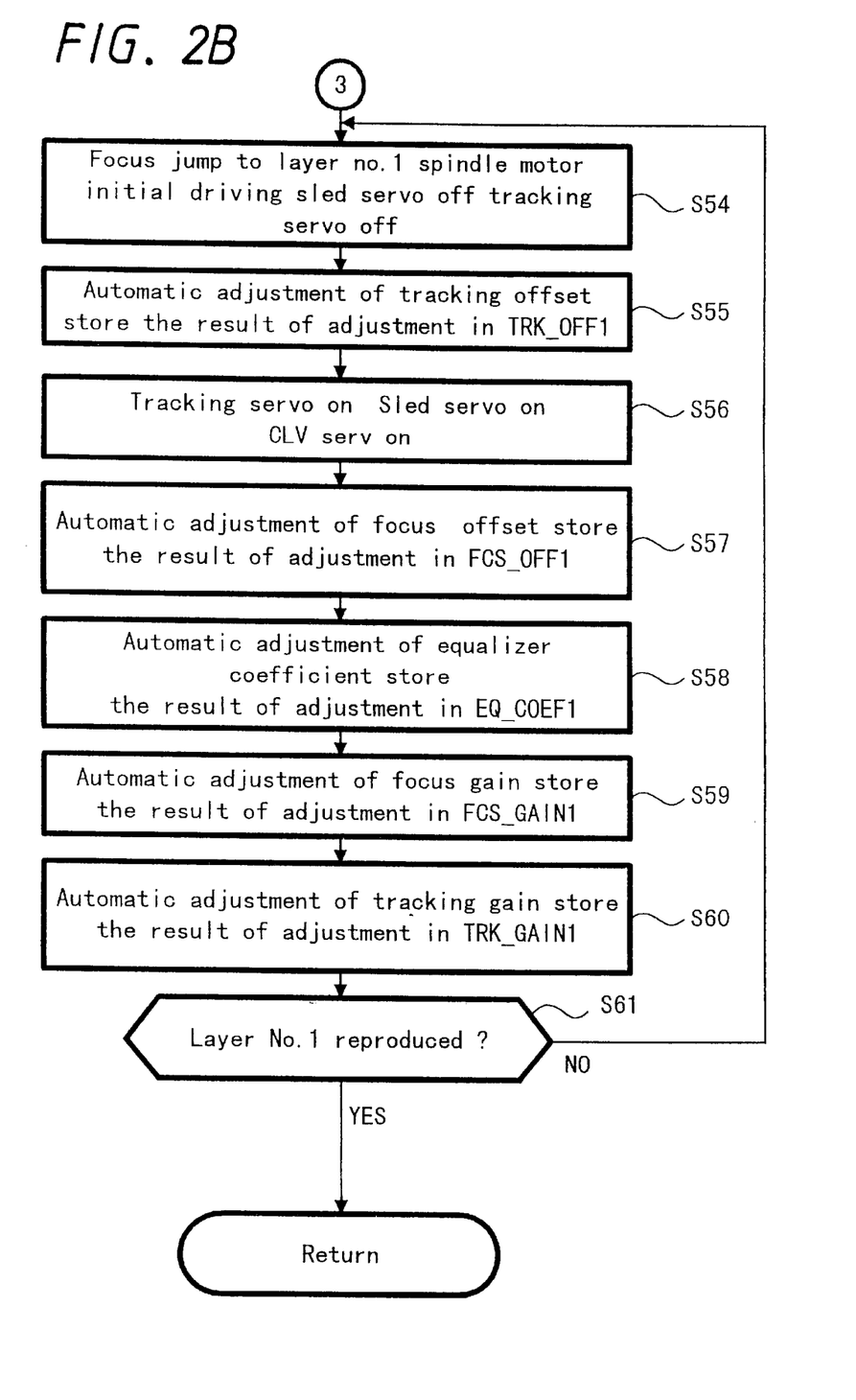

The first embodiment of the initialization procedure is depicted by the flowchart of FIGS. 2A and 2B. As can be seen from the figures, the first step (S41) in the first procedure is to perform individual initialization of certain units, namely units 21–26.

Next, at step S42, the control unit causes switch 31 to couple the initial drive circuit to the spindle motor such that the non-CLV control signal is supplied to the motor. At step S43, the control unit turns on the radial skew servo circuit, and at step S44, the control unit turns on the focus servo circuit.

At step S45, adjustment of the tracking offset is carried out. To adjust the tracking offset, the tracking servo circuit varies the tracking position of the optical pick-up within a predetermined range of positions in order to determine the DC component of the tracking error signal. Upon determination of the DC component, the tracking offset setting/automatic adjustment unit sets the tracking offset to a value that exactly cancels the DC component and stores the determined track offset as the tracking offset adjustment value for layer 0 (i.e. stores the offset as the variable "TRK_OFF0").

Figure 4A:
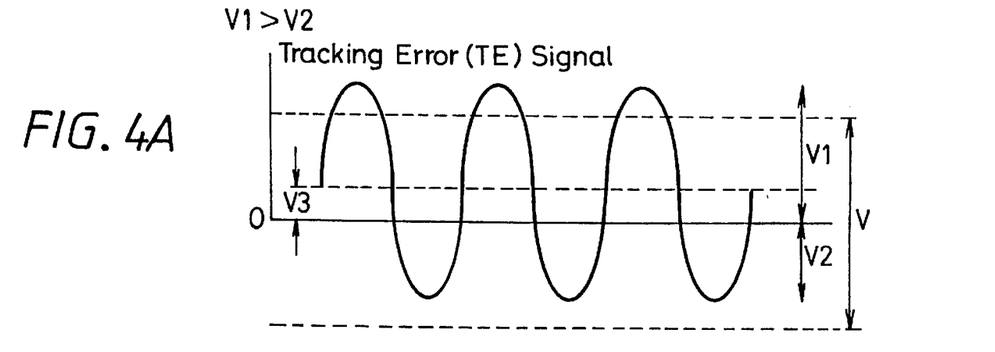
FIGS. 4A and 4B are graphs useful in describing a preferred tracking adjustment technique in accordance with the invention.
Figure 4B:
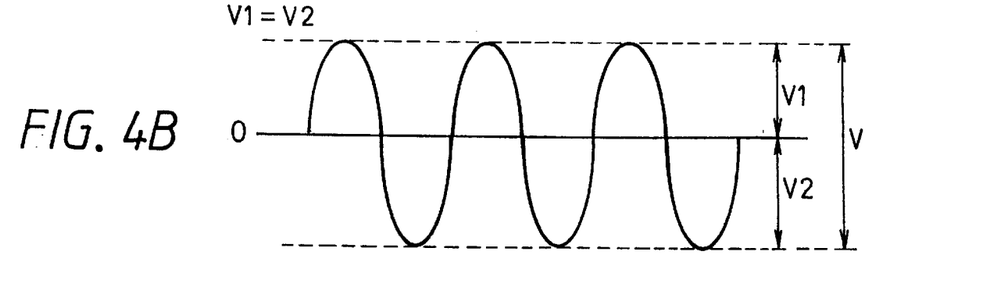

FIGS. 4A and 4B are graphs which are helpful in illustrating how determination of the tracking offset adjustment value is carried out. FIG. 4A shows an example of a tracking error signal voltage that is generated when the tracking servo circuit varies the tracking position of the optical pickup within a predetermined range. As can be seen, the DC component of the depicted tracking error signal is V3 (V1–V2). FIG. 4B shows the tracking error signal voltage that results under similar conditions, but subject to a tracking offset adjustment value that cancels the DC component.

Referring back to FIGS. 2A and 2B, at step S46, the control unit turns on the tracking servo circuit and the sled servo circuit, and causes switch 31 to couple the CLV circuit to the spindle motor.

At step S47, the radial skew offset setting/automatic adjustment unit determines the radial skew offset adjustment values based on the jitter level received from the jitter measuring unit and stores the determined values. Since the radial skew is the same for each layer in the disc, radial skew offset adjustment value determination is performed only once, and is not repeated for each layer.

To determine the radial skew offset adjustment value for a given portion of the disc, the radial skew unit varies the skew angle of the optical pick-up within a predetermined range of skew angles and sets the radial skew offset adjustment value according to the skew angle where the jitter level is minimized.

Figure 5:
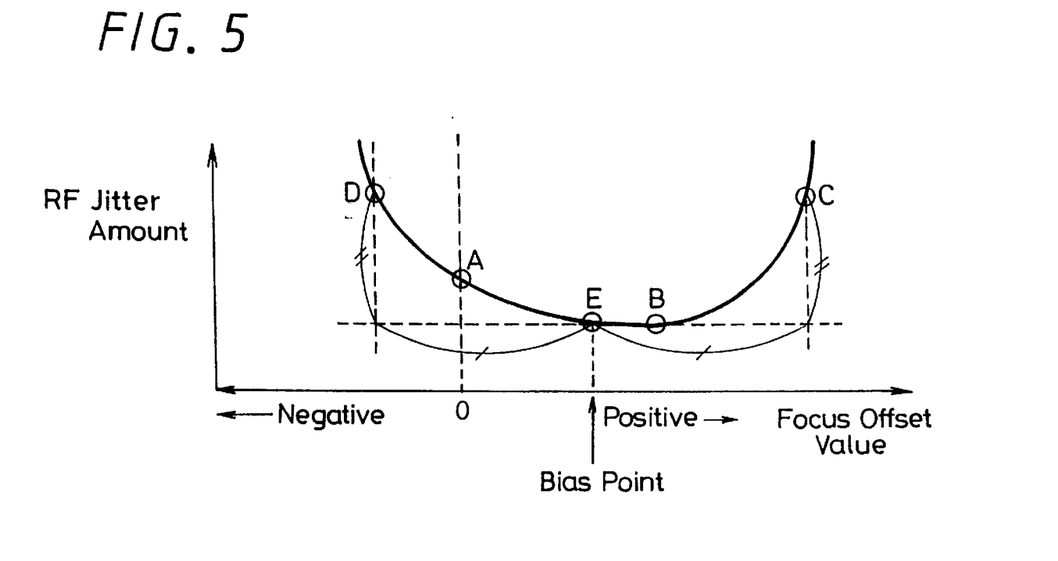
FIG. 5 is a graph useful in describing a preferred focus adjustment technique in accordance with the invention.

FIG. 5 shows how the radial skew offset adjustment value for a given portion of the disc is determined. Initially, the skew offset value is set to "0" and the jitter value corresponding to the "0" offset (point A) is stored. The skew offset value is then varied about "0" in both the positive and negative directions in order to determine the point of minimum jitter (point B).

Once the offset corresponding to minimum jitter is determined, the offset is increased (positive direction) from the value corresponding to minimum jitter to a "positive displacement offset value", at which the jitter has increased to a predetermined level above the minimum jitter (point C), and the positive displacement offset value is saved. Next, the offset is decreased (negative direction) from the value corresponding to minimum jitter to a "negative displacement offset value", at which the jitter has once again increased to a predetermined level above the minimum jitter (point D), and the negative displacement offset value is saved.

Finally, the positive displacement offset value and negative displacement offset value are averaged to determine the radial skew offset adjustment value (point E, or "Bias Point"), which will be used during reproduction.

Computing the radial skew offset adjustment value in this manner, rather than by simply setting the offset to the value at which the jitter appears minimum (point B), provides for a system that is more error tolerant. For example, interference in the form of dust particles on the disc may prevent determination of the jitter minimum point to within an acceptable tolerance; whereas the above-described averaging technique will mitigate the effect of such interference and thereby allow determination of a bias point that is within acceptable tolerance.

Referring back to FIGS. 2A and 2B, at step S48, the focus offset setting/automatic adjustment unit determines a focus offset adjustment value for layer 0. The focus offset adjustment value is determined in the same manner that the radial skew offset adjustment values are determined. That is, the focus offset unit varies the focus position according to the same algorithm described in with respect to FIG. 5. The determined focus offset adjustment value is stored in the adjustment value storage unit as the variable "FCS_OFF0".

At step S49, the equalizing coefficient setting/automatic adjustment unit computes one or more equalizer coefficients in the same manner that the radial skew offset adjustment values and focus offset adjustment values are determined. That is, the coefficients are set according to the algorithm described in relation to FIG. 5. The coefficient(s) that result in the lowest jitter level are the coefficient(s) that will be used in reproduction of layer 0, and they are stored in the adjustment value storing unit as "EQ_COEF0".

Figure 6:
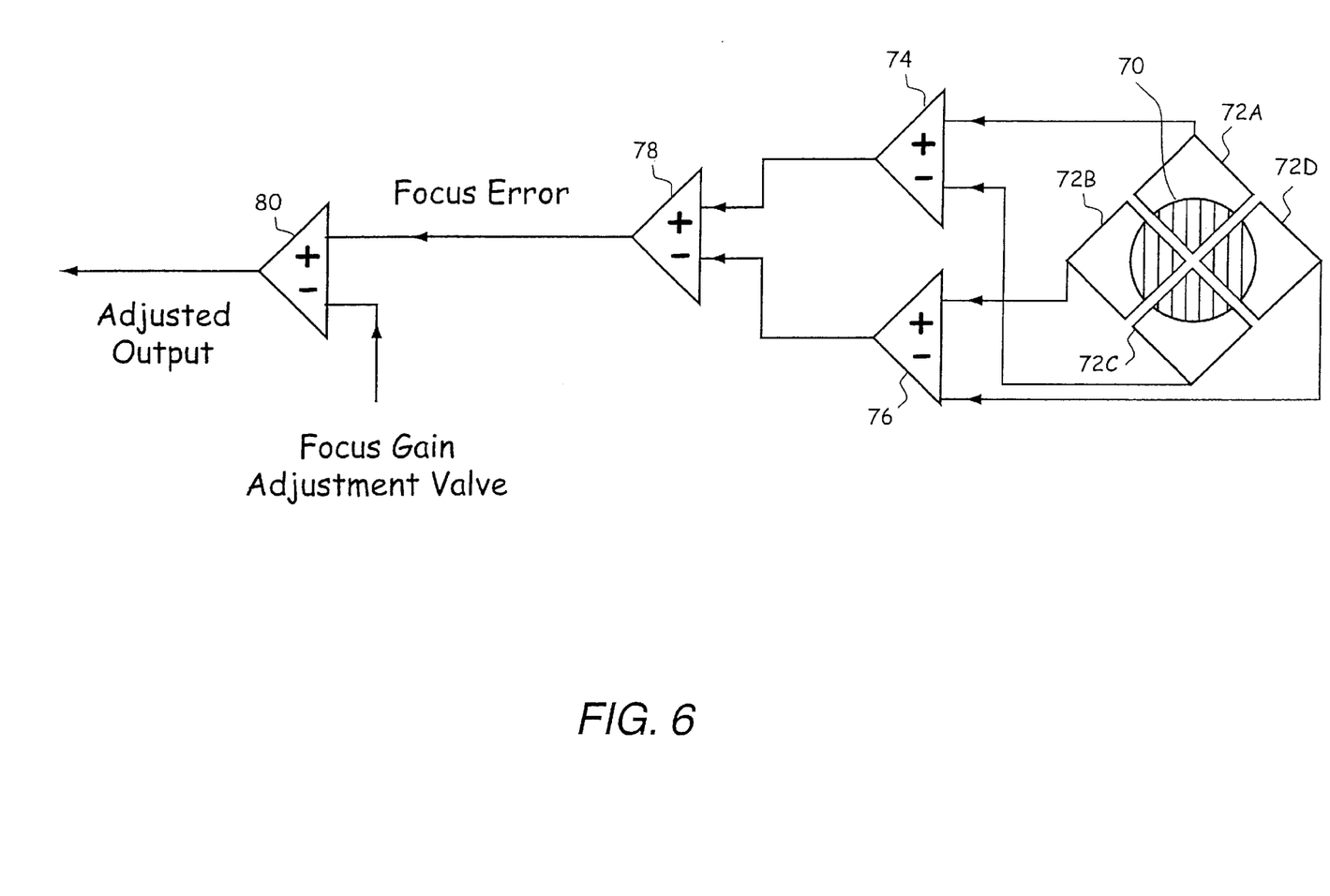
FIG. 6 is a schematic diagram an illustrative configuration for calculating the focus gain adjustment value.

At step S50, the focus gain setting/automatic adjustment unit calculates the focus gain adjustment value for layer 0 based on the focus error signal received from the optical pick-up. FIG. 6 shows an illustrative configuration for use in calculating the focus gain adjustment value.

In the FIG. 6 configuration the optical pick-up's "detection area" is made up of four photo detector elements, denoted by the reference numerals 72A, 72B, 72C and 72D. For purposes of calculating the focus gain adjustment value, the detection area is centered over a pit 70 so that the amount of pit-detector overlap is approximately equal for each detector. Once the detection area is properly positioned, the outputs of detectors 72A and 72C are coupled to non-inverting inputs of a first differential amplifier 74, which serves to add the outputs of detectors 72A and 72C and amplify the resulting sum. Similarly, the outputs of detectors 72B and 72D are coupled to non-inverting inputs of a second differential amplifier 76, which serves to add the outputs of detectors 72B and 72D and amplify the resulting sum. The output of amplifier 76 is coupled to a non-inverting input of a third differential amplifier 78, and the output of amplifier 74 is coupled to an inverting input of amplifier 78. In an ideal circuit, sensors 72A, 72B, 72C and 72D would have identical characteristics, as would operational amplifiers 74–78, and centering the pit in the detection area would result in a 0 V output from amplifier 78. However, in real circuits even circuit elements of the same type have characteristics that vary from element-to-element (e.g., sensitivity to temperature, offset voltage, gain), and therefore centering the pit in the detection area generally does not result in a 0 V output from amplifier 78.

The output of amplifier 78 for the case of a centered pit is the focus error. In order to correct for the focus error, a fourth differential amplifier 80 is provided. The focus error is input to a non-inverting terminal of amplifier 80, while the focus gain adjustment value is input to an inverting terminal of amplifier 80, the focus gain adjustment value being varied until it cancels the focus error signal (i.e., drives the output of amplifier 80 to 0 V). The focus gain adjustment value that cancels the focus error signal is stored in the adjustment value storage unit as "FCS_GAIN0".

Figure 7:
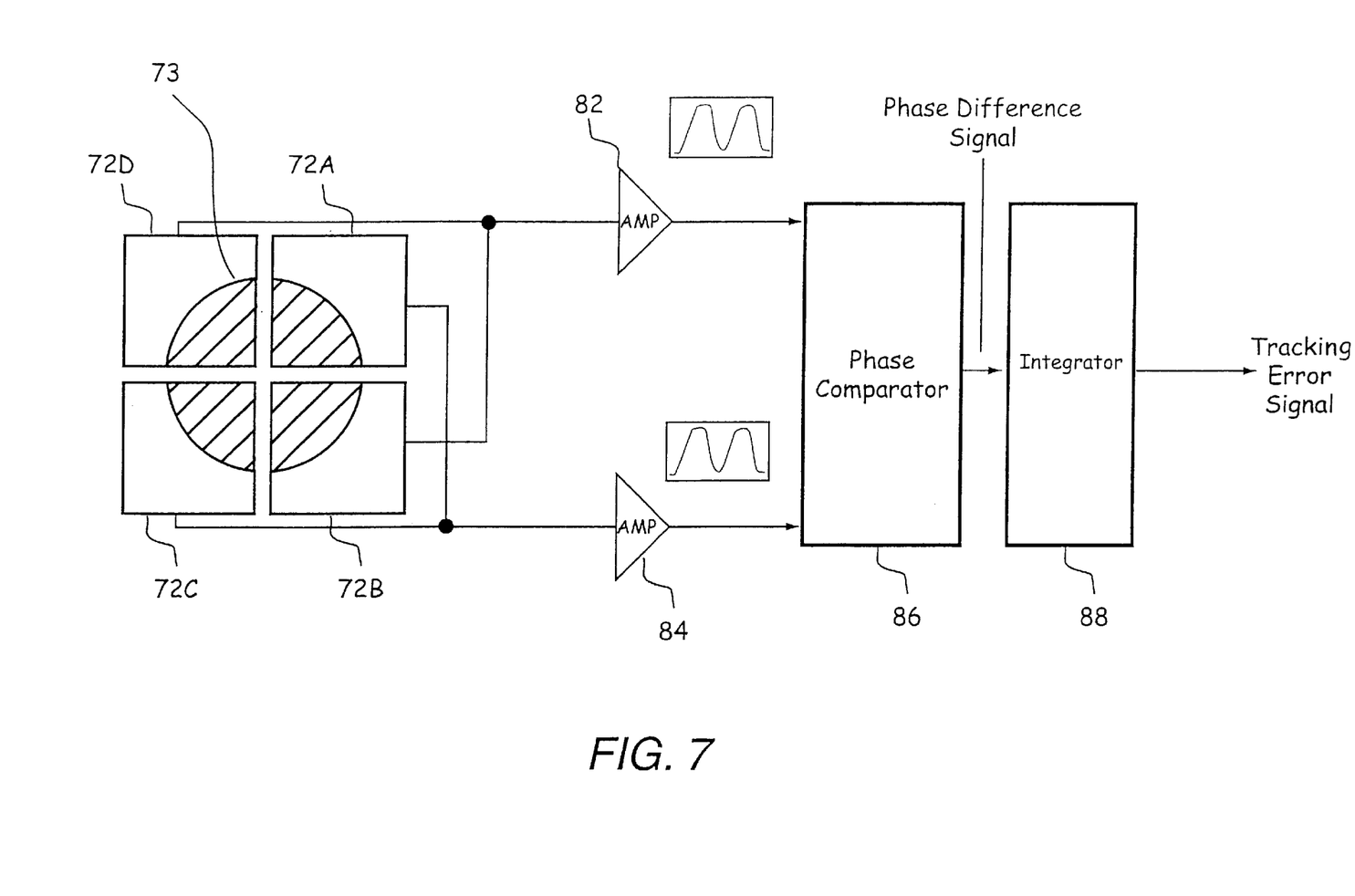
FIG. 7 is a schematic diagram of an illustrative configuration for calculating the tracking error signal.

Referring back to FIGS. 2A and 2B, at step S51, the tracking gain setting/automatic adjustment unit calculates the tracking gain adjustment value for layer 0 based on the tracking error signal received from the optical pick-up. FIG. 7 shows an illustrative configuration for use in calculating the tracking error signal, and FIG. 8 shows an illustrative configuration for calculating the tracking gain adjustment value.

As can be seen from FIG. 7, tracking error signal generation is described in the context of an optical pick-up like that of FIG. 6; namely a pick-up having four photo detector elements 72A, 72B, 72C and 72D. The outputs of detectors 72D and 72B are added and passed to an amplifier 82. Similarly, the outputs of detectors 72A and 72C are added and passed to an amplifier 84. The output of each amplifier approximates one cycle of a sine wave for the period of time in which pit 73 passes into, through, and out of the detection area. Thus, for multiple pits, the amplifier outputs approximate multiple cycles of a sine wave. The amplifier outputs are passed to a phase comparator 86 which compares the two signals and outputs a phase difference signal indicative of the amount or phase (or time) difference between the two outputs. The phase difference signal is, in turn, passed to an integrator 88 which smooths the difference signal to generate the tracking error signal.

Figure 8:
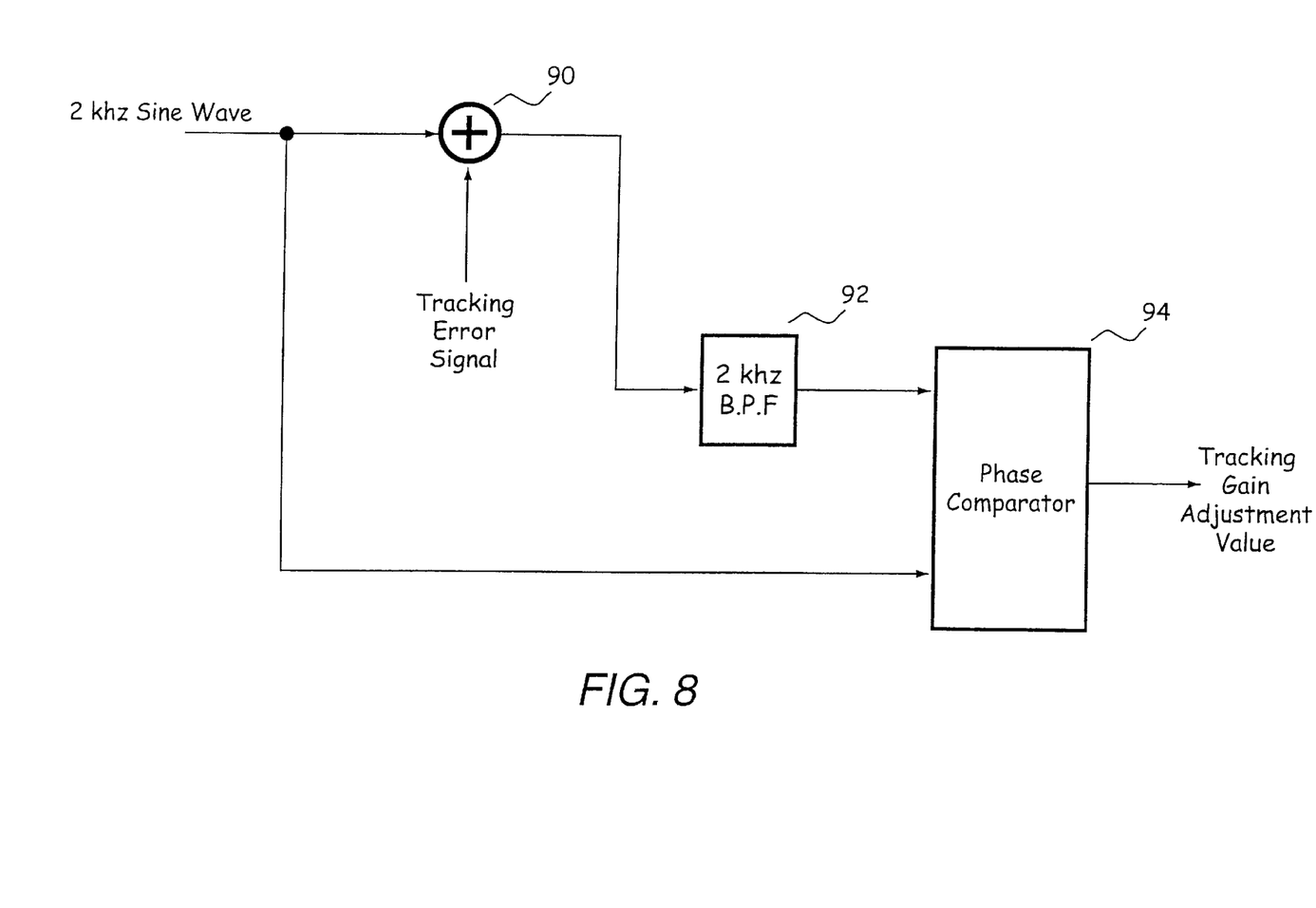
FIG. 8 is a schematic diagram of an illustrative configuration for calculating the tracking gain adjustment value.

The tracking error signal is used in the configuration of FIG. 8 to generate the tracking gain adjustment value. As can be seen from FIG. 8, the tracking error signal is added to a 2 KHz sine wave by an adder 90, and the output of the adder is passed through a 2 KHz band pass filter 92. The output of the band pass filter is passed to one input of a phase comparator 94, and the 2 KHz sine wave is passed to the other input of the phase comparator. The phase comparator generates a tracking gain adjustment value that is proportional to the phase difference between the filter output and the 2 KHz sine wave. This tracking gain adjustment value is stored in the adjustment value storage unit has "TK_GAIN0".

Referring back to FIGS. 2A and 2B, at step S52, the content of a predetermined disc address is read, and from the content at the disc address a determination is made as to whether or not the optical pick-up was focused on layer 0 during execution of steps S45–S51. If it is determined that the pick-up was not focused on layer 0 during execution of steps S45–S51; step S53 is executed, that is, the tracking servo circuit and sled servo circuit are turned off, switch 31 is directed to couple the initial drive circuit to the spindle motor, the focus position of the optical pick-up is set to layer 0, and steps S45–S51 are repeated. On the other hand, if it is determined at step S52 that the pick-up was focused on layer 0 during the original execution of steps S45–S51, the process proceeds to step S54.

At step S54, the tracking servo circuit and sled servo circuit are turned off, switch 31 is directed to couple the initial drive circuit to the spindle motor, and the focus position of the optical pick-up is set to layer 1.

At step S55, a tracking offset adjustment value is determined in the same manner in which it was determined in step S45, however the value determined in step S55 is stored as the tracking offset adjustment value for layer 1 (i.e. "TRK_OFF1").

At step S56, the control unit turns on the tracking servo circuit and the sled servo circuit, and causes switch 31 to couple the CLV circuit to the spindle motor.

At step S57, a focus offset adjustment value is determined in the same manner in which it was determined in step S48, however the value determined in step S57 is stored as the focus offset adjustment value for layer 1 (i.e. "FCS_OFF1").

At step S58, one or more equalizer coefficients are determined in the same manner in which it was determined in step S49, however the coefficient(s) determined in step S58 are stored as the coefficient for layer 1 (i.e. "EQ_COEF1").

At step S59, the focus gain adjustment value is determined in the same manner in which it was determined in step S50, however the value determined in step S59 is stored as the focus gain adjustment value for layer 1 (i.e. "FCS_GAIN1").

At step S60, the tracking gain adjustment value is determined in the same manner in which it was determined in step S51, however the value determined in step S60 is stored as the tracking gain adjustment value for layer 1 (i.e. "TRK_GAIN1").

At step S61, the content of a predetermined disc address is read, and from the content at the disc address a determination is made as to whether or not the optical pick-up was focused on layer 1 during execution of steps S54–S60. If it is determined the pick-up was not focused on layer 1 during execution of steps S54–S60, steps S54–60 are repeated. Such a situation may occur, for example, when the original focus jump at step 54 (following step S52) fails, rendering original execution of steps S54–S60 ineffective.

On the other hand, if it is determined at step S61 that the pick-up was focused on layer 1 during the original execution of steps S54–S60, the initialization parameters necessary for reproduction of both layers have been determined and the initialization procedure is complete.

As can be seen from the above-description, the first embodiment of the initialization procedure requires that the optical pick-up focus on the layers in a fixed sequence (e.g. layer 0 followed by layer 1, as described); and in the event that the sequence is not followed, requires the repeat execution of certain steps (e.g. the repeat of steps S45–S51, as described). The second embodiment of the initialization procedure, to be described below, does not require that the pick-up focus on the layers in a fixed sequence, and therefore does not require repeat execution of steps.

Figure 3A:
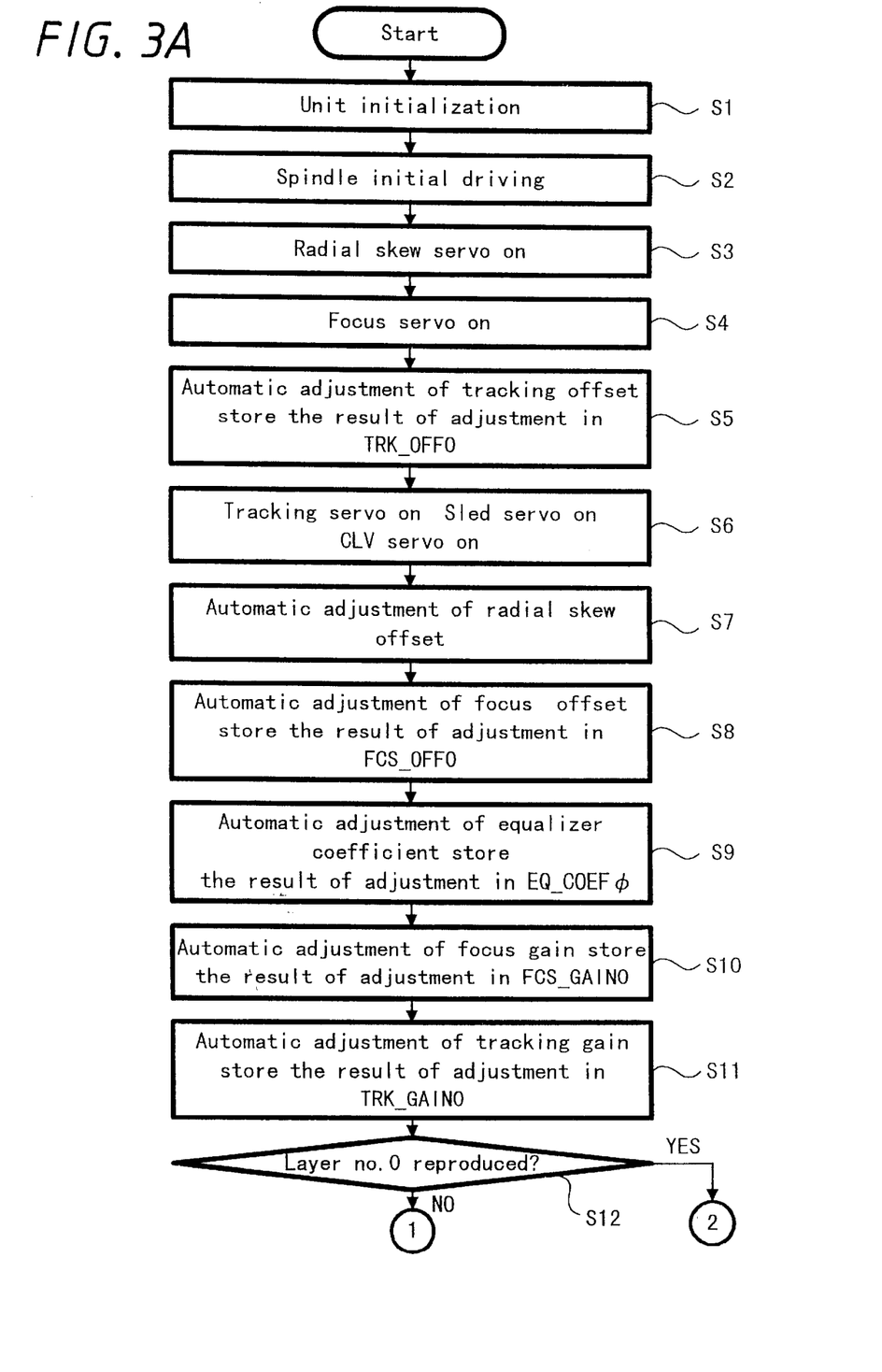
FIGS. 3A, 3B and 3C make up a flow chart useful in describing an initialization procedure in accordance with a second embodiment of the invention.
Figure 3B:
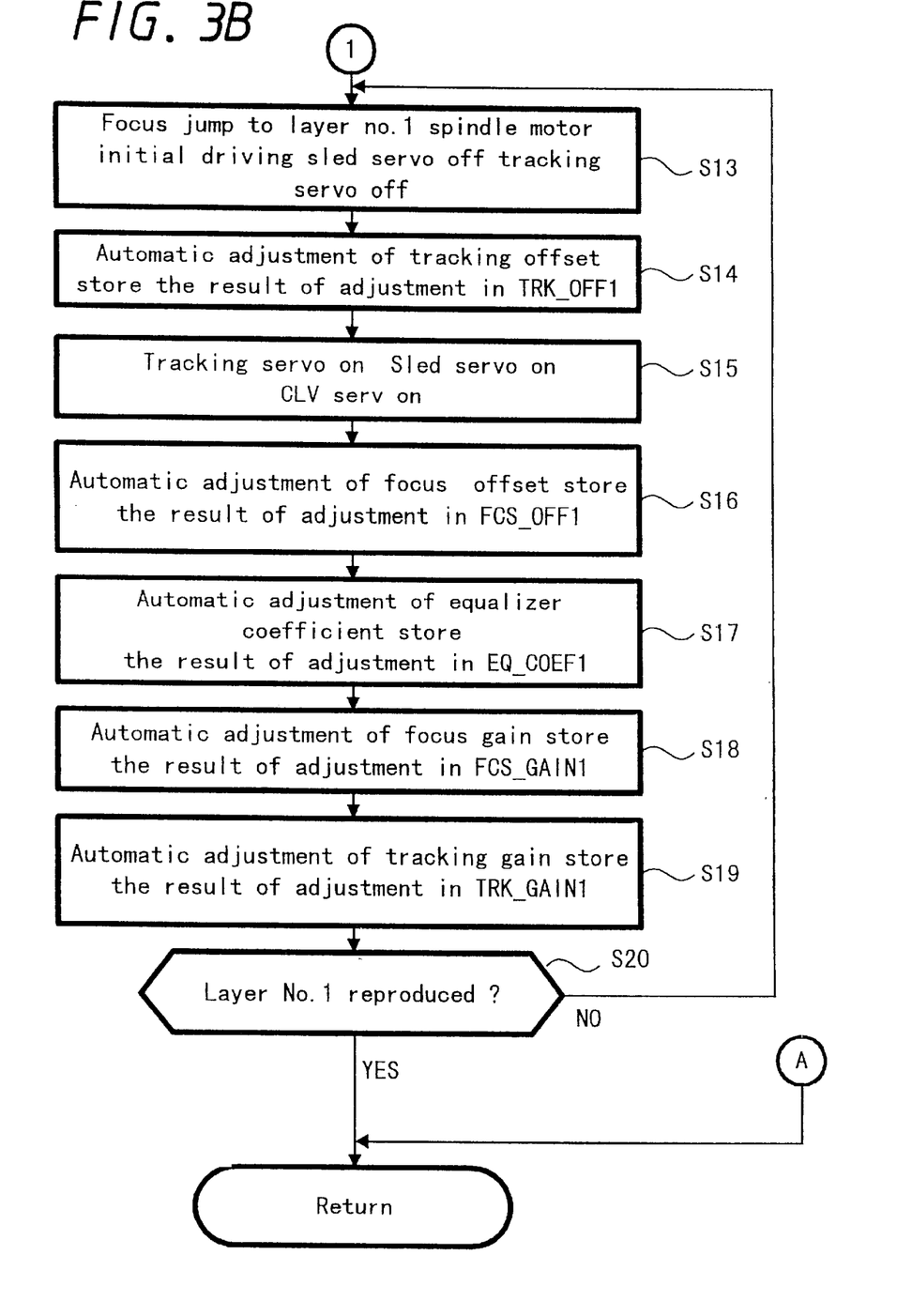
Figure 3C:
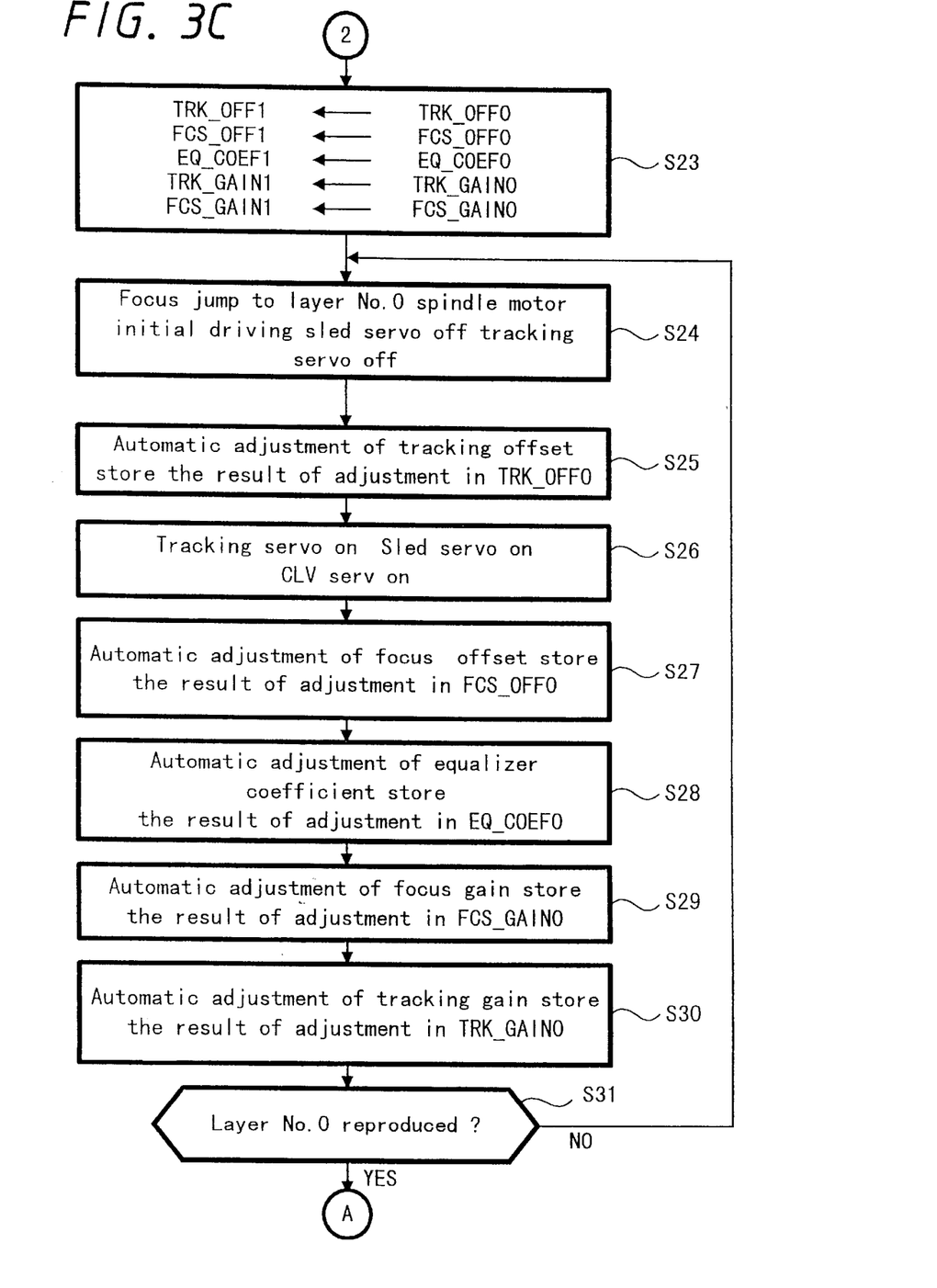

The second embodiment of the initialization procedure is depicted by the flowchart of FIGS. 3A, 3B and 3C. Steps S1–S11 of the second embodiment are performed in the same manner as steps S41–S51 of the first embodiment, respectively.

At step S12, the content of a predetermined disc address is read, and from the content at the disc address a determination is made as to whether or not the optical pick-up was focused on layer 0 during execution of steps S1–S11. If it is determined that the pick-up was not focused on layer 0 during execution of steps S1–11, branch "1" of the procedure is followed. If it is determined that the pick-up was focused on layer 0 during execution of steps S1–11, branch "2" of the procedure is followed.

In steps S1–S11 the presumption is made that the optical pick-up is focused on layer 0, and therefore the initialization parameters determined during steps S1–S11 are assigned to layer 0. Thus, When step S12 indicates that layer 0 was indeed the focus layer during execution of steps S1–S11, the subsequent steps (branch "1") simply determine the initialization parameters for layer 1. Accordingly, steps S13–S20 of branch "1" are identical to steps S54–S61 of the first embodiment, respectively.

However, when step S12 indicates that the optical pick-up was not focused on layer 0 during execution of steps S1–S11, the subsequent steps (branch "2") involve assigning the parameters determined in step S1–S11 to layer 1, and then determining the parameters for layer 0. Accordingly, at step S23 the parameters determined in steps S1–S11 assigned to layer 1 (i.e. the values of TRK_OFF0, FCS_OFF0, EQ_COEF0, TRK_GAIN0, and FCS_GAIN0 are assigned to TRK_OFF1, FCS_OFF1, EQ_COEF1, TRK_GAIN1, and FCS_GAIN1, respectively) and steps S24–S31 are executed—steps S24–S31 being identical to steps S13–S20, respectively, with the exception that steps S24–S31 are directed to determining the initialization parameters for layer 0.

Thus, in the second embodiment initialization values are merely assigned to the layer that was in focus at the time the values were determined and there are no "wasted" value determinations. Thereby, allowing for a more efficient procedure relative to that of the first embodiment.

While the present invention has been particularly shown and described in conjunction with preferred embodiments thereof, it will be readily appreciated by those of ordinary skill in the art that various changes may be made without departing from the spirit and scope of the invention. Therefore, it is intended that the appended claims be interpreted as including the embodiments described herein as well as all equivalents thereto.

What is claimed is:

1. A method of initializing an optical disc player for reproducing data from a side of a multilayer optical disc, wherein the side includes a plurality of layers, comprising the steps of:

determining at least one initialization value for a layer of data on said side;

identifying said layer;

storing said at least one initialization value for use in reproducing at least a portion of one of said layers of said side; and repeating said steps of determining, identifying and storing for the remaining layers on said side of said disc.

2. The method according to claim 1, wherein said at least one initialization value is a tracking offset adjustment value.

3. The method according to claim 2, wherein said tracking offset adjustment value is set to a value that causes a DC component of a tracking error signal to be canceled.

4. The method according to claim 1, wherein said at least one initialization value is a tracking gain adjustment value.

5. The method according to claim 1, wherein said at least one initialization value is a focus offset adjustment value.

6. The method according to claim 5, wherein said focus offset adjustment value is set according to a minimum jitter level.

7. The method according to claim 1, wherein said at least one initialization value is a focus gain adjustment value.

8. The method according to claim 1, wherein said at least one initialization value is an equalizer coefficient.

9. The method according to claim 1, wherein when said identifying indicates that said layer is a desired layer said initialization value is stored for use in reproducing said layer.

10. The method according to claim 9, wherein when said identifying indicates that said layer is not said desired layer said initialization value is stored for use in reproducing an other layer of the plurality of layers.

11. The method according to claim 9, wherein when said identifying indicates that said layer is not said desired layer said initialization value is not stored.

12. An apparatus for initializing an optical disc player prior to reproducing data from a side of a multilayer optical disc, wherein the side includes a plurality of layers, comprising:

means for determining at least one initialization value for a layer of data on said side;

means for identifying said layer:

means for storing said at least one initialization value for use in reproducing at least a portion of one of said layers of said side; and means for repeating said steps of determining identifying and storing for the remaining layers on said side of said disc.

13. The apparatus according to claim 12, wherein said at least one initialization value is a tracking offset adjustment value.

14. The apparatus according to claim 13, wherein said tracking offset adjustment value is set to a value that causes a DC component of a tracking error signal to be canceled.

15. The apparatus according to claim 12, wherein said at least one initialization value is a tracking gain adjustment value.

16. The apparatus according to claim 12, wherein said at least one initialization value is a focus offset adjustment value.

17. The apparatus according to claim 16, wherein said focus offset adjustment value is set according to a minimum jitter level.

18. The apparatus according to claim 12, wherein said at least one initialization value is a focus gain adjustment value.

19. The apparatus according to claim 12, wherein said at least one initialization value is an equalizer coefficient.

20. The apparatus to claim 12, wherein when said means for identifying indicates that said layer is a desired layer said initialization value is stored for use in reproducing said layer.

21. The apparatus according to claim 20, wherein when said means for identifying indicates that said layer is not said desired layer said initialization value is stored for use in reproducing an other layer of the plurality of layers.

22. The apparatus according to claim 20, wherein when said means for identiying indicates that said layer is not said desired layer said initialization value is not stored.

23. An apparatus for initializing an optical disc player prior to reproducing data from a side of a multilayer optical disc, wherein the side includes a plurality of layers, comprising:

at least one initialization value setting unit for determining at least one initialization value for a first layer of data on said side and at least one initialization value for a second layer of data on said side;

means for identifying said first layer and said second layer, wherein said identification for a layer is performed after said initialization value for said layer has been determined; and an adjustment value storing unit for storing said initialization values for use in reproducing at least a portion of said first layer of data and at least a portion of said second layer of data.

24. The apparatus according to claim 23, wherein when said means for identifying indicates that said layer is a desired layer said initialization value is stored for use in reproducing said layer.

25. The apparatus according to claim 24, wherein when said means for identifying indicates that said layer is not said desired layer said initialization value is stored for use in reproducing an other layer of the plurality of layers.

26. The apparatus according to claim 24, wherein when said means for identifying indicates that said layer is not said desired layer said initialization value is not stored.

* * * * *